United States Patent
Niwa et al.

(10) Patent No.: US 6,695,482 B2
(45) Date of Patent: Feb. 24, 2004

(54) HALF BEARING WITH GROOVES PREVENTING LEAKAGE OF LUBRICATING OIL

(75) Inventors: Masayuki Niwa, Aichi (JP); Yoshitaka Ito, Aichi (JP); Mitsuru Sugita, Aichi (JP); Akira Ono, Aichi (JP); Susumu Mamiya, Aichi (JP); Masaaki Sakamoto, Aichi (JP)

(73) Assignee: Daido Metal Company Ltd., Aichi (JP)

( * ) Notice: Subject to any disclaimer, the term of this patent is extended or adjusted under 35 U.S.C. 154(b) by 5 days.

(21) Appl. No.: 10/025,576

(22) Filed: Dec. 26, 2001

(65) Prior Publication Data

US 2002/0085779 A1 Jul. 4, 2002

(30) Foreign Application Priority Data

Dec. 25, 2000 (JP) .......................... 2000-392680

(51) Int. Cl.$^7$ ................................ F16C 33/10
(52) U.S. Cl. ................... 384/294; 384/288; 384/291
(58) Field of Search ................. 384/276, 283, 384/286, 287, 288, 291, 292, 294

(56) References Cited

U.S. PATENT DOCUMENTS

| | | | | |
|---|---|---|---|---|
| 2,850,334 A | * | 9/1958 | Hurley | 384/294 |
| 3,386,783 A | * | 6/1968 | Scheufler | 384/291 |
| 5,238,311 A | * | 8/1993 | Katou et al. | 384/288 |
| 6,082,904 A | * | 7/2000 | Ono et al. | 384/291 |
| 6,273,612 B1 | * | 8/2001 | Ono et al. | 384/276 |

FOREIGN PATENT DOCUMENTS

JP      JP-03048017 A   *   3/1991 ................ 384/291

* cited by examiner

Primary Examiner—Thomas R. Hannon
(74) Attorney, Agent, or Firm—Browdy and Neimark

(57) ABSTRACT

A half bearing constituting a cylindrical plain bearing for supporting a shaft for rotation when two of the half bearings are combined together. The half bearing has two circumferential ends each of which has a plurality of circumferential grooves without formation of any crush relief surface. The grooves extend substantially over an overall circumferential dimension of the half bearing and include portions located at both circumferential ends of the half bearing respectively. Each portion has a larger axially sectional area than the grooves formed in a portion of the half bearing mainly subjected to load during rotation of the shaft.

2 Claims, 4 Drawing Sheets

HALF BEARING WITH GROOVES PREVENTING LEAKAGE OF LUBRICATING OIL

BACKGROUND OF THE INVENTION

1. Field of the Invention

This invention relates to a half bearing constituting a cylindrical plain bearing when two of the half bearings are combined together.

2. Description of the Related Art

A plain bearing is used to support a rotating shaft such as a crankshaft of an internal combustion engine, for example. The plain bearing is made by combining two generally semicylindrical half bearings into a cylindrical form. A lubricating oil is supplied between an inner circumferential surface of the plain bearing and the rotating shaft so as to form an oil film.

Conventional half bearings constituting the plain bearing have crush relief surfaces formed on inner circumferential surfaces of both circumferential ends thereof respectively. The crush relief surfaces are formed so as to spread substantially over an entire width of the bearing or axial dimension of the bearing with respect to a shaft supported by the bearing. When a plain bearing is assembled into a bearing housing, joints of the respective half bearings sometimes shift from each other. Furthermore, when a crush height of the bearing is excessively high, the bearing is sometimes brought into a local contact with the shaft as the result of a radially inward swelling due to deformation in the vicinity of the joint. The aforesaid crush relief surfaces prevent the shift of the joints and the local contact. In the conventional half bearings, however, a large amount of lubricating oil leaks axially from each crush relief surface.

SUMMARY OF THE INVENTION

Therefore, an object of the present invention is to provide a half bearing which can reduce an amount of lubricating oil leaking therefrom with the function of the crush relief surface being maintained.

To achieve the object, the present invention provides a half bearing constituting a cylindrical plain bearing for supporting a shaft for rotation when two of the half bearings are combined together, the half bearing having two circumferential ends each of which has a plurality of circumferential grooves without formation of any crush relief surface, wherein the grooves extend substantially over an overall circumferential dimension of the half bearing and include portions located at both circumferential ends of the half bearinq respectively, each portion having a larger axially sectional area than the grooves formed in a portion of the half bearing mainly subjected to load during rotation of the shaft.

The half bearing is formed with a plurality of the circumferential grooves in the inner circumferential surfaces of both circumferential ends thereof although no crush relief surface is formed there. Protrusions defined between the grooves tend to be easily conformed to the shaft to be worn due to contact with the shaft. Accordingly, when the half bearings are combined together into a plain bearing, the protrusions are conformed to the shaft to be worn at an early stage such that worn portions serve as crush relief surfaces. Thus, the function of the crush relief surface can be achieved although the half bearing is formed with no crush relief surfaces. A region serving as the crush relief surfaces is minimum in this case. As a result, an amount of lubricating oil leaking in the half bearing can be smaller than in a case where a half bearing is positively provided with crush relief surfaces. Moreover, the half bearing can prevent an axial leakage of the lubricating oil more effectively since the grooves extend circumferentially.

Furthermore, the grooves extend substantially over an overall circumferential dimension of the half bearing and include portions located at both circumferential ends of the half bearing respectively. Further, each said portion has a larger axially sectional area than the grooves formed in a portion of the half bearing mainly subjected to load during rotation of the shaft. A large amount of lubricating oil can be supplied without reduction in a load capacity of the portion mainly subjected to load during rotation of the shaft. Consequently, an anti-seizure property and a sliding characteristic can be improved.

In a preferred form, said portions of the grooves located at both circumferential ends respectively are deeper than the grooves formed in the portion of the half bearing mainly subjected to load during rotation of the shaft. In addition to the effect of increasing an amount of lubricating oil fed to the portion mainly subjected to the load, the protrusions located at both circumferential ends tend to be easily conformed to the shaft to be worn with contact with the shaft since the protrusions have a lower strength than those located between the grooves of the portion mainly subjected to the load during rotation of the shaft.

BRIEF DESCRIPTION OF THE DRAWINGS

Other objects, features and advantages of the present invention will become clear upon reviewing the following description of embodiments, made with reference to the accompanying drawings, in which.

DETAILED DESCRIPTION OF EMBODIMENTS

Figure 1:
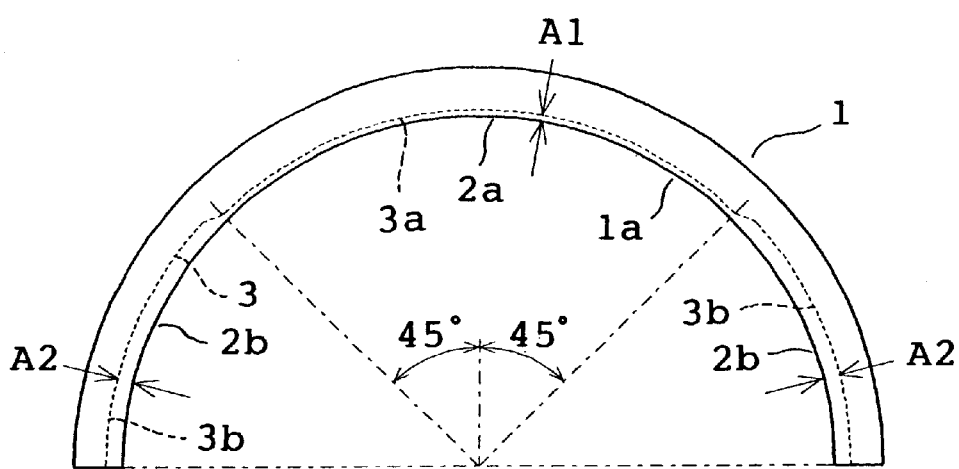
FIG. 1 is a front view of the half bearing of a first embodiment in accordance with the present invention.
Figure 2:
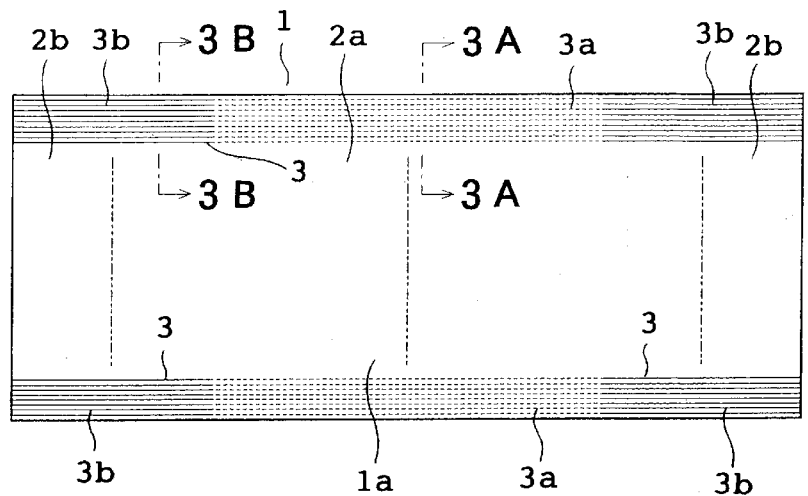
FIG. 2 is a developed view of the half bearing, showing an inner circumferential surface thereof.

A first embodiment of the present invention will be described with reference to FIGS. 1 to 4. Referring to FIGS. 1 and 2, a half bearing 1 of the embodiment is generally formed into a semicylindrical shape. The half bearing 1 has both circumferential ends 2b each of which has no crush relief surface.

Figure 3A:
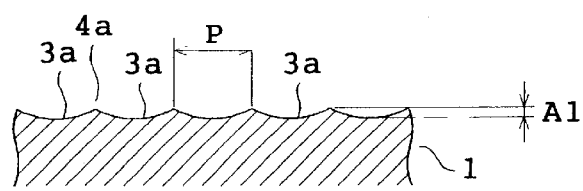
FIG. 3A is a partially enlarged sectional view taken along line 3A—3A in FIG. 2.
Figure 3B:
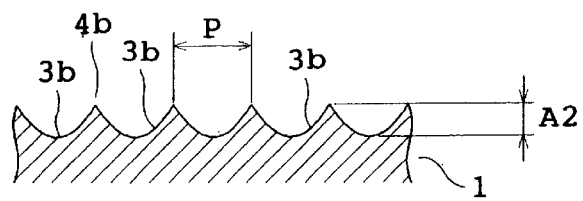
FIG. 3B is a partially enlarged sectional view taken along line 3B—3B in FIG. 2.

The half bearing 1 includes an inner circumferential surface 1a formed by boring using cutting tools (not shown). The inner circumferential surface 1a has a plurality of circumferentially continuously extending grooves 3 substantially over an overall surface. The grooves 3 include shallow grooves 3a falling within two continuous ranges of 45 degrees in opposite directions respectively from a perpendicular on a midpoint on a straight line between both circumferential ends of the half bearing, as shown in FIG. 1. The grooves 3 further include deep grooves 3b falling within two separate ranges of 45 degrees located adjacent to the continuous ranges of the shallow grooves 3a at the opposite circumferential ends respectively, as shown in FIG. 1. The grooves 3b are deeper than the grooves 3a as shown in FIGS. 1, 3A and 3B. In FIG. 1, bottoms of the shallow and deep grooves 3a and 3b are represented by dotted line. In FIG. 2, the shallow grooves 3a are represented by dotted line whereas the deep grooves 3b are represented by solid line for discrimination therebetween. Further, axially middle portions of the grooves 3 are eliminated in FIG. 2.

Referring now to FIGS. 3A and 3B, protrusions or ridges 4a are formed between the shallow grooves 3a. Protrusions or ridges 4b are also formed between the deep grooves 3b. Each groove 3a has a depth A1 from the protrusion 4a to the bottom, which depth A1 is about 0.0015 mm (about 1.5 μm). Each groove 3b has a depth A2 from the protrusion 4b to the bottom, which depth A2 is about 0.005 mm (about 5 μm). A pitch between the protrusions 4a and a pitch between the protrusions 4b are equal to each other and about 0.3 mm. Accordingly, each of the deep grooves 3b located at both circumferential ends has a larger sectional area than each of the shallow grooves 3a located near the central portion 2a and mainly subjected to load during rotation of a shaft, as will be described later.

Figure 4:
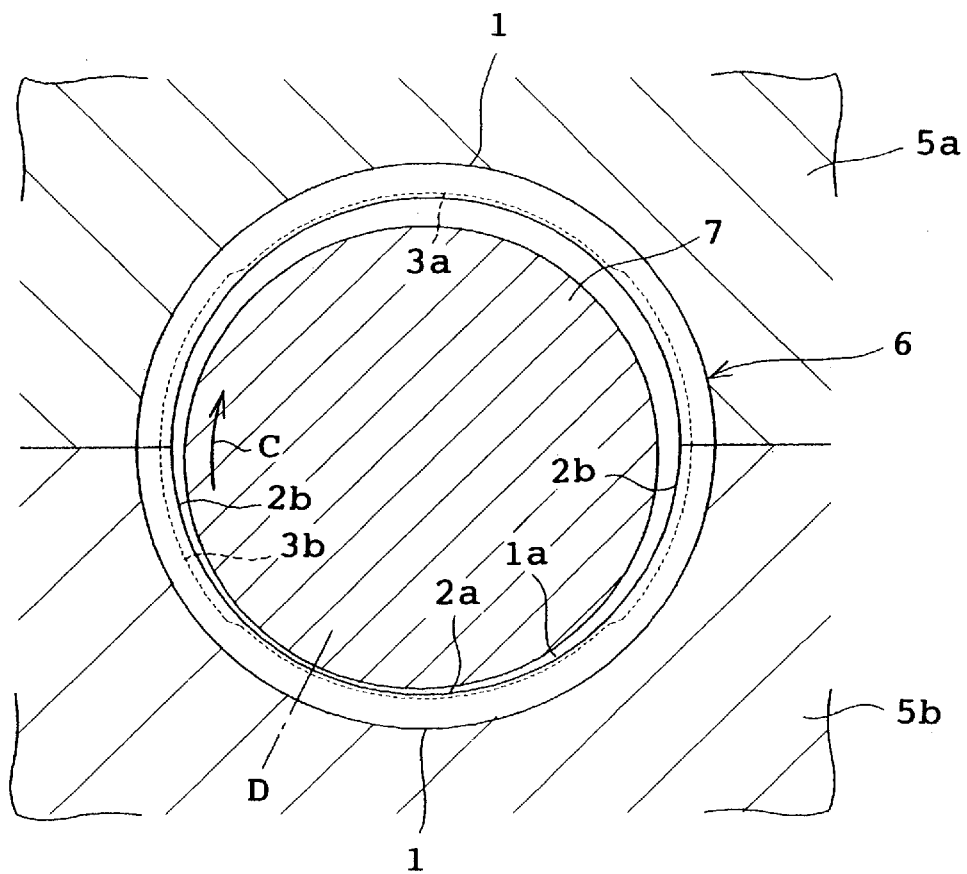
FIG. 4 is a longitudinally sectional front view of a plain bearing comprising the half bearings of the embodiment.

Referring to FIG. 4, a plain bearing made by combining two half bearings 1 described above is shown. Two half bearings 1 are combined together between upper and lower bearing housings 5a and 5b into a generally cylindrical shape, thereby constituting a cylindrical plain bearing 6. A shaft 7 such as a crankshaft is fitted into the bearing 6. A lubricating oil is supplied between an inner circumferential surface of the bearing 6 and the shaft 7 so that an oil film is formed.

While the shaft 7 is being rotated in the direction of arrow C in FIG. 4, a shaft load of the shaft 7 is received mainly by a portion D of the inner circumferential surface 1a of the lower half bearing 1 slightly to the right of the central portion 2a (in the same direction as the shaft 7 is rotated) due to an oil film produced by rotation of the shaft. A thickness of the oil film becomes minimum at the portion D, and the portion D depends on an operating condition. The portion D can be forecast. The portion D corresponds to the shallow grooves 3a on the inner circumferential surface of the half bearing 1.

According to the above-described embodiment, the grooves 3 formed in the inner circumferential surface 1a of the half bearing 1 include the deep grooves 3b which are located at both circumferential ends thereof and which are deeper than the shallow grooves 3a located at the portion D mainly subjected to the shaft load during rotation of the shaft 7. Accordingly, each deep groove 3b has a larger sectional area than each shallow groove 3a. As a result, each of the protrusions 4b formed between the deep grooves 3b located at both circumferential ends 2b has a lower strength than each of the protrusions 4a between the shallow grooves 3a. Accordingly, each protrusion 4b located at both circumferential ends tends to be easily conformed to the shaft 7 to be worn with contact with the shaft 7.

When the above-described half bearings 1 are combined together into the plain bearing 6, the protrusions 4b between the deep grooves 3b at both circumferential ends 2b are conformed to the shaft 7 to be worn in an early stage with contact with the shaft 7 being rotated. Each worn portion serves as a crush relief surface. Thus, the function of the crush relief surface can be achieved although the half bearing 1 is formed with no crush relief surfaces. Since a region serving as the crush relief surfaces is minimum in this case, an amount of lubricating oil leaking in the half bearing 1 can be smaller than in a case where a half bearing is positively provided with crush relief surfaces. Moreover, the half bearing 1 can prevent an axial leakage of the lubricating oil more effectively since the deep grooves 3b extend circumferentially.

Furthermore, the shallow grooves 3a are circumferentially continuous with the deep grooves 3b. Since the lubricating oil smoothly flows along the grooves 3, a larger amount of lubricating oil can be supplied to the portion D mainly subjected to load during rotation of the shaft 7. Consequently, an anti-seizure property and a sliding characteristic of the plain bearing can be improved.

It is considered that the grooves 3 formed in the inner circumferential surface 1a of the half bearing 1 include only the deep grooves 3b. In this construction, an oil film tends to be easily broken in the portion D mainly subjected to the load during rotation of the shaft 7, whereupon the bearing performance is lowered. On the other hand, it is considered that the grooves 3 include only the shallow grooves 3a. However, since wear of the protrusions 4a due to conformance to the shaft 7 cannot be expected, the function of the crush relief surface cannot be achieved.

Figure 5:
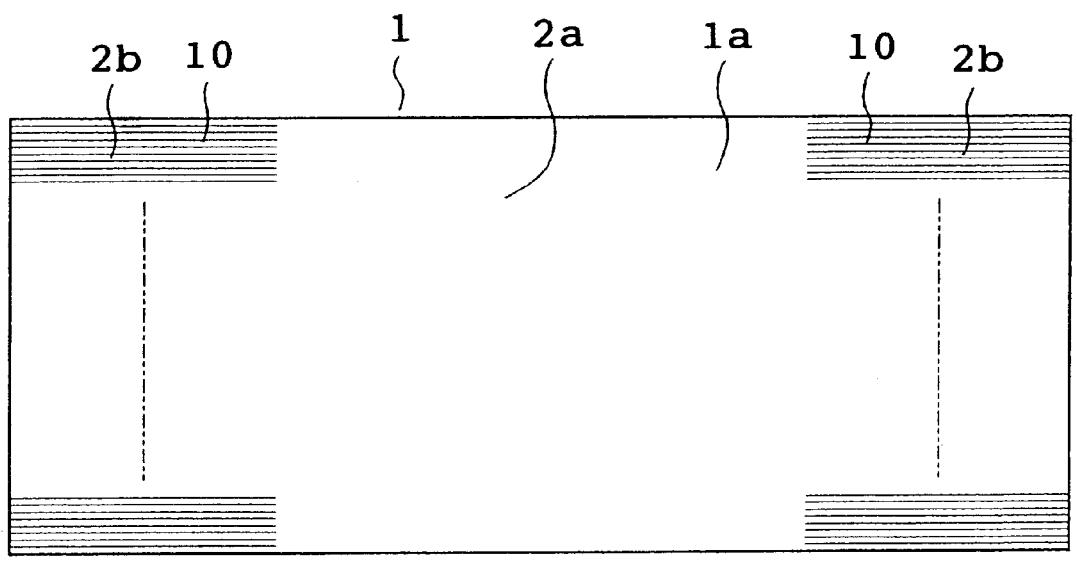
FIG. 5 is a view similar to FIG. 2, showing a half bearing of a second embodiment in accordance with the invention.

FIG. 5 illustrates a second embodiment of the invention. Only the difference between the first and second embodiments will be described. In the second embodiment, grooves 10 are formed only in both circumferential ends 2b of the inner circumferential surface 1a of the half bearing 1. The other portion of the inner circumferential surface 1a including the portion D mainly subjected to the shaft load has no grooves.

The invention should not be limited by the foregoing embodiments. Various modifications and expansions are possible. For example, the depth of each groove formed in the inner circumferential face 1a may continuously be reduced as each groove extends from each of both circumferential ends 2b to come near the main load-receiving region D.

The region of the shallow grooves 3a preferably includes the portion D mainly subjected to the shaft load and ranges between 30 and 60 degrees rightward and leftward from the perpendicular on the midpoint on the line between the circumferential ends of the half bearing 1. The remaining both circumferential ends preferably include the deep grooves 3b. Accordingly, the regions of the shallow and deep grooves 3a and 3b may or may not be in a bilateral symmetry.

The shallow and deep grooves 3a and 3b may be discontinuous. Furthermore, of the grooves, those located at both circumferential ends of the half bearing may be formed as follows in order that each of these grooves may have a larger sectional area than each groove in the portion D mainly subjected to the shaft load. That is, each of the grooves formed in both circumferential ends is formed so as to be as deep as each groove in the portion D mainly subjected to the shaft load and so that a pitch between the grooves in both circumferential ends is larger than that in the portion D. In this construction, too, the sectional area of each groove located at both circumferential ends can be rendered larger than each groove in the portion D mainly subjected to the shaft load. Additionally, the grooves 3 may be formed only in both axial ends.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A half bearing constituting a cylindrical plain bearing for supporting a shaft for rotation when two of the half bearings are combined together, the half bearing having two circumferential ends each of which has a plurality of circumferential grooves without formation of any crush relief surface, wherein the grooves extend substantially over an overall circumferential dimension of the half bearing and include portions located at both circumferential ends of the half bearing respectively, each said portion having a larger axially sectional area than the grooves formed in a portion of the half bearing mainly subjected to load during rotation of the shaft.

2. A half bearing according to claim 1, wherein said portions of the grooves located at both circumferential ends respectively are deeper than the grooves formed in the portion of the half bearing mainly subjected to load during rotation of the shaft.

* * * * *